(12) United States Patent
Mori et al.

(10) Patent No.: US 9,142,975 B2
(45) Date of Patent: Sep. 22, 2015

(54) DISCHARGE SYSTEM AND ELECTRIC VEHICLE

(75) Inventors: Kohei Mori, Chiyoda-ku (JP);
Toshihide Satake, Chiyoda-ku (JP);
Akinobu Sugiyama, Chiyoda-ku (JP);
Hiroshi Fujioka, Chiyoda-ku (JP);
Takanori Matsunaga, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 474 days.

(21) Appl. No.: 13/704,120

(22) PCT Filed: Sep. 15, 2011

(86) PCT No.: PCT/JP2011/071077
§ 371 (c)(1),
(2), (4) Date: Dec. 13, 2012

(87) PCT Pub. No.: WO2012/043249
PCT Pub. Date: Apr. 5, 2012

(65) Prior Publication Data
US 2013/0082663 A1    Apr. 4, 2013

(30) Foreign Application Priority Data
Sep. 27, 2010    (JP) ................... 2010-214779

(51) Int. Cl.
*H01M 10/46* (2006.01)
*H02J 7/00* (2006.01)
(Continued)

(52) U.S. Cl.
CPC ............... *H02J 7/00* (2013.01); *B60L 11/1842* (2013.01); *H01M 10/425* (2013.01);
(Continued)

(58) Field of Classification Search
CPC .................. H02J 7/0063; H02J 7/0065; H02J 2007/0067
USPC ................. 320/104, 107, 109, 111, 135, 141; 705/44
See application file for complete search history.

(56) References Cited

U.S. PATENT DOCUMENTS 6,104,160 A    8/2000    Iwata et al.
8,103,386 B2   1/2012    Ichikawa et al.
(Continued)

FOREIGN PATENT DOCUMENTS

CN    101507075 A    8/2009
CN    102106056 A    6/2011
(Continued)

OTHER PUBLICATIONS

Communication dated Sep. 2, 2014 from the State Intellectual Property Office of the People's Republic of China in counterpart application 201180036098.0.
(Continued)

*Primary Examiner* — Edward Tso
(74) *Attorney, Agent, or Firm* — Sughrue Mion, PLLC; Richard C. Turner

(57) ABSTRACT

In a discharge system that outputs DC power from a vehicle battery to the outside, improved safety is obtained during discharge of the battery. A discharge system includes an electric car having a battery unit mounted thereon, and a discharge device that discharges the battery unit. The electric car includes a connector to which the discharge device is connected, and a power line that connects the connector and the battery unit to each other. In the power line, switches and switching elements are provided. The switches render the power line conducting upon permission from the discharge device and a battery management unit. The switching elements adjust a current flowing in the power line when the battery unit is discharged.

11 Claims, 4 Drawing Sheets

(51) Int. Cl.
*B60L 11/18* (2006.01)
*H01M 10/42* (2006.01)

(52) U.S. Cl.
CPC .......... *H02J 7/0068* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | | |
|---|---|---|---|
| 8,368,352 B2 | 2/2013 | Ichikawa et al. | |
| 2009/0192655 A1 | 7/2009 | Ichikawa et al. | |
| 2011/0055036 A1* | 3/2011 | Helfan | 320/101 |
| 2011/0084664 A1* | 4/2011 | White et al. | 320/134 |
| 2011/0121779 A1 | 5/2011 | Ichikawa et al. | |

FOREIGN PATENT DOCUMENTS

| | | | |
|---|---|---|---|
| EP | 2309617 | A1 | 4/2011 |
| JP | 11-178234 | A | 7/1999 |
| JP | 2001-008380 | A | 1/2001 |
| JP | 2002-084673 | A | 3/2002 |
| JP | 3758986 | B2 | 3/2006 |
| JP | 2006-320065 | A | 11/2006 |
| JP | 2008-054439 | A | 3/2008 |
| JP | 4380776 | B1 | 12/2009 |
| JP | 2010-035277 | A | 2/2010 |
| WO | 2010010754 | A1 | 1/2010 |

OTHER PUBLICATIONS

International Preliminary Report on Patentability for International Application No. PCT/JP2011-071077 issued Apr. 11, 2013 and its English Language translation dated Apr. 25, 2013.

Communication dated Apr. 3, 2015 from the State Intellectual Property Office of the P.R.C. in counterpart application No. 201180036098.0.

* cited by examiner

DISCHARGE SYSTEM AND ELECTRIC VEHICLE

CROSS REFERENCE TO RELATED APPLICATIONS

This application is a National Stage of International Application No. PCT/JP2011/071077 filed Sep. 15, 2011, claiming priority based on Japanese Patent Application No. 2010-214779, filed Sep. 27, 2010, the contents of all of which are incorporated herein by reference in their entirety.

TECHNICAL FIELD

The present invention relates to a charge/discharge system for a vehicle battery, and particularly to ensuring of the safety during discharge.

BACKGROUND ART

In recent years, development of a next-generation power grid called "smart grid", which is configured with automatic control means for automatically control the supply and demand of power being incorporated into a power grid, is attracting attention. In the smart grid, a power flow in the power grid is controlled not only by a supplier side but also by a demander side, and thereby the supply and demand of power are optimized.

For example, there is a possibility that a battery of a car owned by each home can be used as a buffer for lowering the peak of a power demand (for example, Patent Documents 1 to 4 listed below). To be specific, power that has been charged in a vehicle battery during low power demand times is used in a house during the peak of the power demand, and thereby the peak of the power demand is lowered. This also can save an electric bill at each home because, in general, the power cost is low during the low power demand times. Additionally, there is an advantage that enabling the power of the vehicle battery to be used at home can address an emergency situation such as a power failure. The smart grid is intended to automatically control such a power flow.

For example, in a power management system disclosed in Patent Document 1, a power demand from a house is estimated in consideration of not only data of a power demand in the house but also data of external factors such as the day of the week, time and date, and the weather. Then, based on a result of the estimate, supply and reception of power between a vehicle and the house (charge and discharge of a vehicle battery) are automatically scheduled.

In a power management system of Patent Document 2, whether to charge a battery or to supply power from the battery to a house is determined in consideration of times and data of a state (a voltage, input and output currents, and a remaining capacity) of the vehicle battery, the amount of ensured power (the amount of power necessary for daily use by a user) and the amount of excess power (the remaining capacity excluding the amount of ensured power and the amount of emergency power) that are defined based on a travel history, and the like.

Thus, in a power grid managed by the smart grid, it is assumed that not only charge of a vehicle battery (power supply from a house to a vehicle) but also discharge of the battery (power supply from the vehicle to the house) is actively performed.

As for a method for drawing DC power of a vehicle into commercial AC power available in a house, the following three methods are disclosed in Patent Documents 1 to 4. In a system of Patent Document 1, DC power of a battery is converted into commercial power by an in-vehicle DC/AC converter, and then outputted to a house. In systems of Patent Documents 2 and 3, DC power of a battery is converted into high-frequency AC power by an in-vehicle DC/AC converter, then transferred to the house side by using electromagnetic induction, and then converted into commercial power by an AC/AC converter provided at the house side. In a system of Patent Document 4, DC power of a battery is outputted to a house without any change, and then it is converted into commercial power by a DC/AC converter provided at the house side.

On the other hand, in a rapid charge system for a battery which is essential for the widespread use of an electric car, a large amount of DC power is directly supplied to the battery to thereby achieve high-speed charge. It is considered that a method in which DC power of a battery is outputted to a house without any change, as disclosed in Patent Document 4, can be achieved by sharing the same power feed line (power line) with this rapid charge system. Therefore, it is not always necessary to provide a new power feed path for discharging the vehicle, and moreover it is not necessary to mount a DC/AC converter in the vehicle. Accordingly, this method is effective in that an in-vehicle power feed system can be simplified.

PRIOR-ART DOCUMENTS

Patent Documents

Patent Document 1: Japanese Patent Application Laid-Open No. 2008-54439
Patent Document 2: Japanese Patent Application Laid-Open No. 2001-8380
Patent Document 3: Japanese Patent Application Laid-Open No. 11-178234 (1999)
Patent Document 4: Japanese Patent Application Laid-Open No. 2002-315193

SUMMARY OF THE INVENTION

Problems to be Solved by the Invention

As described above, a discharge system that outputs DC power of a battery to a house without any change can be achieved by sharing the same power feed line with the rapid charge system. However, a conventional rapid charge system is configured solely to charge a battery, and not designed with sufficient consideration of the safety during discharge.

In a conventional rapid charge system, for the purpose of preventing a short circuit and electrical leakage that may be caused by an incorrect operation or the like, an interlock relay with a switch is provided between a battery and a connector of a vehicle to which a harness used for charging is connected. This switch also serves as a safety device at a time of discharge. When a short circuit or electrical leakage is detected during discharge, the switch is opened to block a power feed path. Theoretically, this would enables safe avoidance of a short circuit and electrical leakage. Actually, however, it is technically difficult to immediately open the switch under a state where a high current is flowing in a power line due to a short circuit or the like. An attempt to open a power line in which a high current is flowing by means of a switch may, for example, cause air-discharge or results in a failure to open because an electrode of the switch is welded to the power line due to heat generated by the high current.

The present invention has been made to solve the above-described problems, and an object of the present invention is to improve the safety during discharge of a battery in a discharge system that outputs DC power from a vehicle battery to the outside.

Means for Solving the Problems

A discharge system according to the present invention is a discharge system including: a vehicle having a battery mounted thereon; and a discharge device configured to be connected to the vehicle from the outside and discharge the battery, wherein the vehicle includes: a battery management device that manages a state of the battery; a connector to which the discharge device is connected; a power line that connects the connector and the battery to each other; a switch that renders the power line conducting upon permission from both the discharge device and the battery management device; and a power adjustment circuit configured to adjust a current flowing in the power line when the discharge device discharges the battery through the connector.

Effects of the Invention

In the present invention, when a defect such as a short circuit and electrical leakage occurs in a discharge path at a time of discharging the battery, the power adjustment circuit provided in the electric vehicle side lowers power that flows in a power line, and then the switch can be safely and surely opened. Additionally, before discharge is started, a simple test of a short circuit and electrical leakage can be performed by causing a low current to flow in the power line.

EMBODIMENT FOR CARRYING OUT THE INVENTION

Embodiment 1

Figure 1:
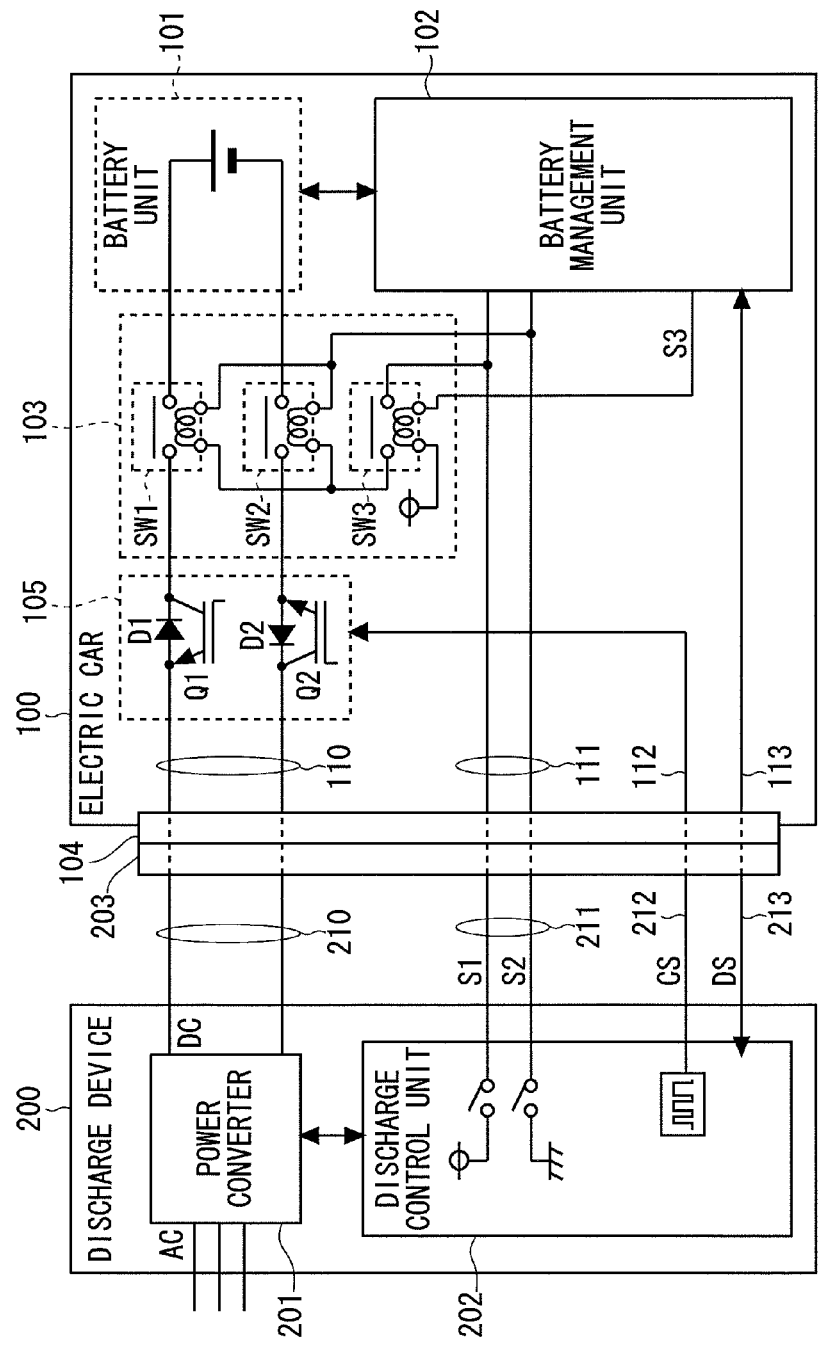
FIG. 1 A diagram showing a configuration of a discharge system according to an embodiment 1.

FIG. 1 is a diagram showing a configuration of a discharge system according to an embodiment 1 of the present invention. This system includes an electric car 100 (electric vehicle) whose power source is power of a battery (secondary battery), and a discharge device 200 that draws power from the battery of the electric car 100 and supplies the power to a house, or the like, existing outside.

The electric car 100 includes a battery unit 101, a battery management unit 102, an interlock relay 103, a connector 104, and a power adjustment part 105.

In the battery unit 101, power serving as the power source of the electric car 100 is accumulated. The battery management unit 102 (battery management device) manages the remaining amount of the power accumulated in the battery unit 101 (hereinafter simply referred to as "remaining amount"). The battery management unit 102 has various communication functions for performing communication with an external device (here, the discharge device 200) connected to the connector 104 through a signal line 111 and a communication line 113. The communication through the communication line 113 is for exchanging information about charge and discharge of the battery unit 101 between the electric car 100 and the external device, by using, example, a communication protocol for CAN (Controller Area Network).

Each terminal of the battery unit 101 is connected through a power line 110 to the connector 104 for the connection to the outside. Thereby, by using the external device connected to the connector 104, the battery unit 101 can be charged and discharged. In the power line 110 connecting the battery unit 101 and the connector 104 to each other, the interlock relay 103 and the power adjustment part 105 are provided in series with each other.

The interlock relay 103 includes three switches SW1 to SW3, and, when permission is given from both the external device and the battery management unit 102 that are connected to the connector 104, renders the power line 110 conducting. More specifically, when three signals, namely, connection permission signals S1 and S2 that are supplied from the external device through the signal line 111 and a connection permission signal S3 that is outputted from the battery management unit 102, satisfy predetermined conditions, the interlock relay 103 renders the power line 110 conducting.

The power adjustment part 105 functions to adjust a current flowing in the power line 110 at a time when the battery unit 101 is discharged to output power from the connector 104. The power adjustment part 105 includes switching elements Q1, Q2 that are provided in series with the power line 110 and serve as a power adjustment circuit, and diodes D1 and D2 that are unidirectional conducting elements and connected in parallel with the switching elements Q1, Q2, respectively. The switching elements Q1, Q2 perform switching on the power line 110 based on a power control signal CS that is supplied through a signal line 112 from the external device connected to the connector 104. For example, a MOSFET or an IGBT is adoptable therefor. The diodes D1 and D2 are provided in such a direction that a current directed to charging the battery unit 101 from the connector 104 is allowed to flow.

The discharge device 200 draws power from the battery unit 101 of the electric car 100, and supplies the power to the house, or the like, and includes a power converter 201, a discharge control unit 202, and a connector 203.

The connector 203 is connected to the connector 104 of the electric car 100, and thereby a power line 210, signal lines 211 and 212, and a communication line 213 of the discharge device 200 are connected to the power line 110, the signal lines 111 and 112, and the communication line 113 of the electric car 100 mentioned above, respectively.

The power converter 201 converts the DC power drawn from the battery unit 101 of the electric car 100 through the connector 104 and the power line 210, into AC power (commercial power) available in a house, or the like. The discharge control unit 202 has functions for controlling an operation of the power converter 201, and for monitoring input and output of the power converter 201 to detect a defect such as occurring of a short circuit in a discharge path, electrical leakage, and the like. The discharge control unit 202 also has various communication function for performing communication with the electric car 100 through the signal lines 211 and 212 and the communication line 213.

In the following, an operation of the discharge system according to this embodiment will be described.

To draw power from the battery unit 101 of the electric car 100 by using the discharge device 200, a user connects the connector 203 of the discharge device 200 to the connector 104 of the electric car 100. Thereby, the power line 210, the signal lines 211 and 212, and the communication line 213 of the discharge device 200 are connected to the power line 110, the signal lines 111 and 112, and the communication line 113 of the electric car 100, respectively.

The discharge control unit 202 transmits the connection permission signals S1 and S2 that are at predetermined levels to the battery management unit 102, thereby requesting connection with the battery unit 101. Here, the connection permission signal S1 is set at a voltage source level, and the connection permission signal S2 are set at the ground level.

When the battery management unit 102 recognizes that the connection permission signal S1 is set at the voltage source level and the connection permission signal S2 is set at the ground level, the battery management unit 102 controls the level of the connection permission signal S3 to render the switch SW3 of the interlock relay 103 conducting. This causes the connection permission signal S1 at the voltage source level and the connection permission signal S2 at the ground level to be supplied to coils of the switches SW1, SW2 provided in the power line 110, so that the switches SW1, SW2 are rendered conducting.

In this manner, only when the permission is given from both the discharge control unit 202 of the discharge device 200 and the battery management unit 102 of the electric car 100, the interlock relay 103 renders the power line 110 conducting. This prevents a voltage of the battery unit 101 to be erroneously outputted to the power line 110 of the electric car 100.

In the electric car 100 of this embodiment, the switching elements Q1, Q2 of the power adjustment part 105 are also provided between the interlock relay 103 and the connector 104. Thus, unless they are turned on, the power of the battery unit 101 is not outputted to the connector 104. Therefore, at the start of discharging the battery unit 101, the discharge control unit 202 turns on the switching elements Q1, Q2 of the power adjustment part 105 by using the power control signal CS.

As a result, the DC power of the battery unit 101 is inputted to the power converter 201 through the power lines 110 and 210, converted into AC power, and supplied to a house, or the like. At this time, information about discharge, such as the remaining amount in the battery unit 101, is transmitted from the battery management unit 102 to the discharge control unit 202 by a digital signal DS. Based on the information, the discharge control unit 202 controls a discharge operation of the battery unit 101. This prevents over discharge of the battery unit 101.

Here, the power adjustment part 105 will be described in detail. As described above, the power adjustment part 105 includes the switching elements Q1, Q2 provided in series with the power line 110, and the diodes D1 and D2 connected in parallel with them, respectively. The diodes D1 and D2 are provided in such a direction that a current directed to charging the battery unit 101 from the connector 104 is allowed to flow. Under control by the discharge control unit 202, the power adjustment part 105 operates so as to adjust a current flowing in the power line 110 at a time of discharging the battery unit 101.

In this embodiment, so-called pulse width control is adopted as a method for controlling a current that flows in the switching elements Q1, Q2. That is, the power control signal CS for the control of the switching elements Q1, Q2 is a pulse signal, and the current flowing in the switching elements Q1, Q2 is adjusted in accordance with a pulse width (duty cycle) thereof. This configuration enables the switching elements Q1, Q2 to be directly driven by using the power control signal CS outputted by the discharge control unit 202. Therefore, it is not necessary to provide a signal converter, or the like, at the electric car 100 side.

While discharge of the battery unit 101 is being performed, the switching elements Q1, Q2 are held in an ON state. In this state, the power control signal CS does not necessarily have a pulse waveform, and may have a DC-like waveform that always keeps the switching elements Q1, Q2 in the ON state. During discharge of the battery unit 101, a reverse voltage is applied to the diodes D1 and D2 and therefore no current flows in the diodes D1 and D2.

When the discharge control unit 202 detects a defect such as a short circuit or electrical leakage during discharge of the battery unit 101, the discharge control unit 202 firstly lowers the current flowing in the power line 110 down to a safe level via the switching elements Q1, Q2 by means of the power control signal CS. Then, the discharge control unit 202 opens the switches SW1, SW2 of the interlock relay 103 by means of the connection permission signals S1 and S2. The switches SW1, SW2 are not suddenly opened upon occurrence of a defect, but the switches SW1, SW2 are opened after the current flowing in the switches SW1, SW2 is sufficiently lowered. Thereby, power feed from the battery unit 101 to the power line 110 can be surely and safely stopped, with avoidance of air-discharge and welding of an electrode. As a result, occurrence of an accident caused by a short circuit or electrical leakage during discharge of the battery unit 101 is prevented.

At the start of discharging the battery unit 101, a current caused to flow in the switching elements Q1, Q2 may not be rapidly increased, but may be gradually increased. In such a case, the discharge control unit 202 can detect a short circuit or electrical leakage in a stage before a high voltage is applied to the power line 110. This means that a simple test of a short circuit and electrical leakage can be performed while the voltage is relatively low before the start of discharge. Thus, the safety during discharge is further enhanced.

In the above, a system configuration in which only discharge of the battery unit 101 of electric car 100 is performed has been described. However, in the electric car 100 according to this embodiment, charge of the battery unit 101 can also be performed through the connector 104 and the power line 110.

Figure 2:
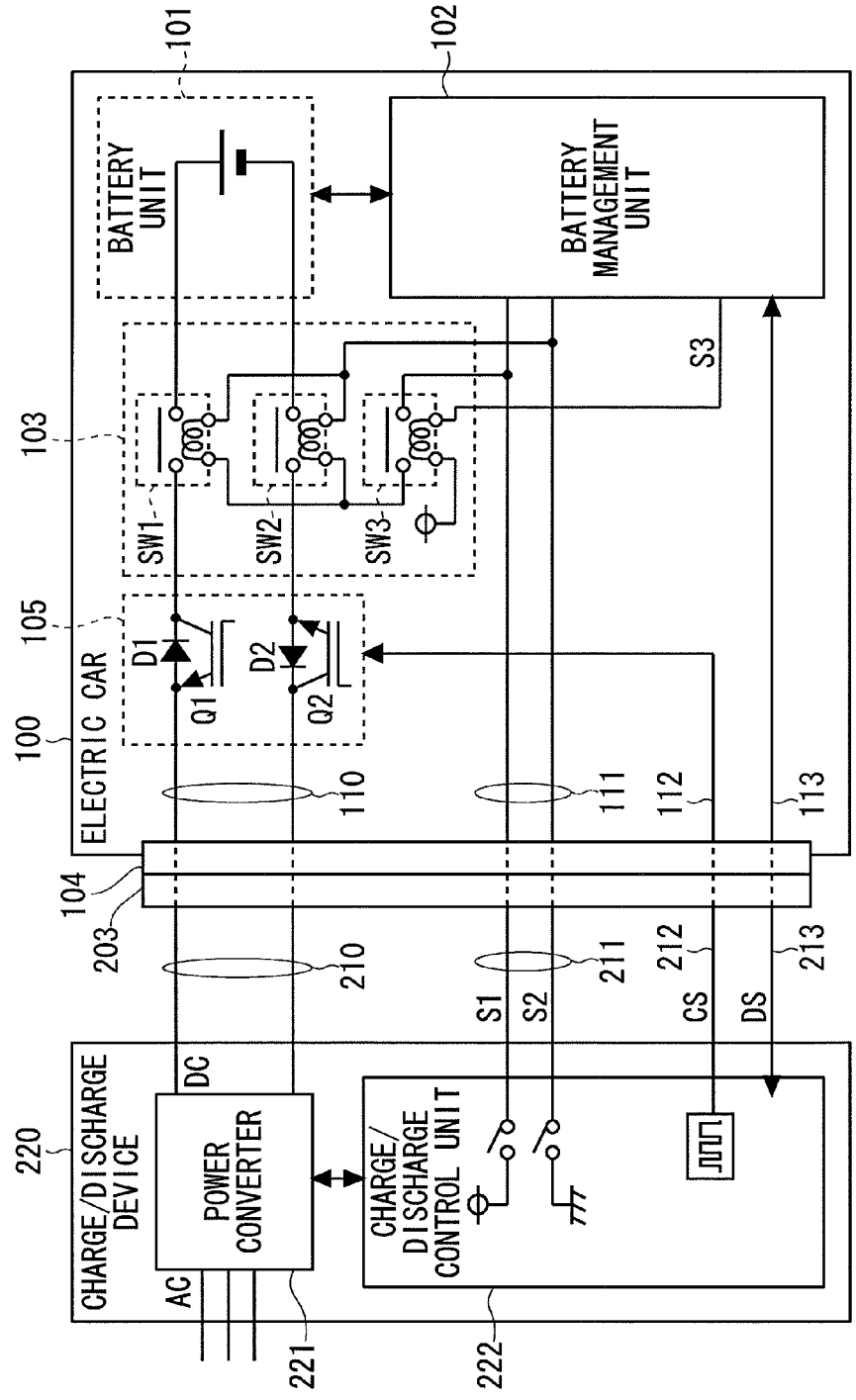
FIG. 2 A diagram showing a configuration of a charge/discharge system according to an embodiment 1.

FIG. 2 shows a configuration of a charge/discharge system in a case where the electric car 100 is connected to a charge/discharge device 220 that is adapted for both charge and discharge of the battery unit 101. In FIG. 2, the same elements as those shown in FIG. 1 are given the same reference numerals, and descriptions thereof are omitted.

A power converter 221 of the charge/discharge device 220 not only converts DC power supplied from the battery unit 101 into commercial AC power, but also converts commercial power into DC power and supplies the commercial power to the battery unit 101, thereby charging the battery unit 101. A charge/discharge control unit 222 controls an operation of the power converter 221, and, at a time of charging the battery unit 101, manages information about charging, such as calculation of a remaining time before the full charge.

In a case where the charge/discharge device 220 charges the battery unit 101 through the connector 104, the interlock relay 103, similarly to the case of discharge, causes conduction between the battery unit 101 and the power line 110 upon permission from both the charge/discharge control unit 222 and the battery management unit 102. On the other hand, differently from the case of discharge, it is not necessary to turn on the switching elements Q1, Q2 of the power adjustment part 105. This is because, at a time of charging the battery unit 101, a forward voltage is applied to the diodes D1 and D2 so that the diodes D1 and D2 are turned on to make it possible to charge the battery unit 101 through the diodes D1 and D2.

Thus, since the power adjustment part 105 includes the diodes D1 and D2, it is not necessary to drive the switching elements Q1, Q2 at a time of charging the battery unit 101. Accordingly, the electric car 100 according to this embodiment allows for versatility because the battery unit 101 can be charged even when a conventional charge device having no means for generating the power control signal CS is used.

Here, the power adjustment part 105 includes the diodes D1 and D2. Therefore, at a time of charging the battery unit 101, the power adjustment part 105 does not function as a safety device that adjusts a current in the power line 110. However, in general, a safety device is normally provided in the power supplier side, and at a time of charging the battery unit 101, the safety is ensured by a safety device provided in the charge device side. Accordingly, there is no problem as long as the power adjustment part 105 of the electric car 100 functions as a safety device only when the battery unit 101 is discharged.

For example, in the charge/discharge system shown in FIG. 2, when the battery unit 101 is charged, a safety device (not shown) of the charge/discharge device 220 that supplies power ensures the safety, while when the battery unit 101 is discharged, the power adjustment part 105 serving as a safety device of the electric car 100 that supplies power ensures the safety.

Embodiment 2

Figure 3:
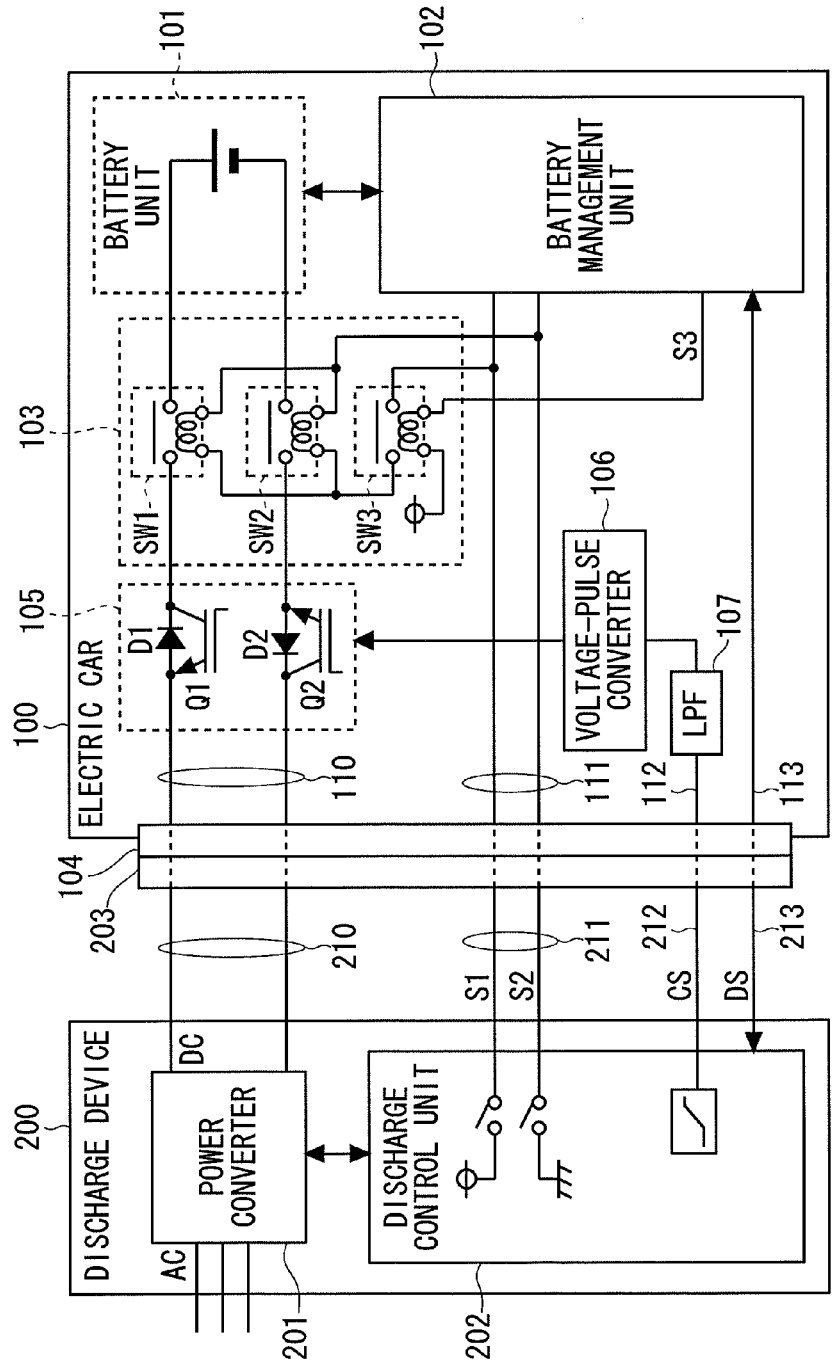
FIG. 3 A diagram showing a configuration of a discharge system according to an embodiment 2.

FIG. 3 is a diagram showing a configuration of a discharge system according to an embodiment 2. This system has the same configuration as that shown in FIG. 1, except that the power control signal CS, which is outputted by the discharge control unit 202 in order to control the power adjustment part 105, is an analog voltage signal.

In this case, a voltage-pulse converter 106 and a low-pass filter (LPF) 107 are provided in the electric car 100. The voltage-pulse converter 106 generates a pulse signal whose pulse width (duty cycle) is in accordance with the amplitude of the power control signal CS that is an analog voltage signal. The low-pass filter 107 eliminates noise from the power control signal CS received from the discharge control unit 202. Through the low-pass filter 107, the power control signal CS is inputted to the voltage-pulse converter 106.

In a general purpose, using the power control signal CS that is a pulse signal as described in the embodiment 1 causes no problem. However, under special circumstances such as when the distance (the length of the harness) between the discharge device 200 and the electric car 100 is extremely large, a pulse waveform of the power control signal CS may be deformed. In such a case, the adjustment of a current in the switching elements Q1, Q2 performed by the power adjustment part 105 may have a deteriorated accuracy. Such a problem can be reduced in this embodiment.

Embodiment 3

Figure 4:
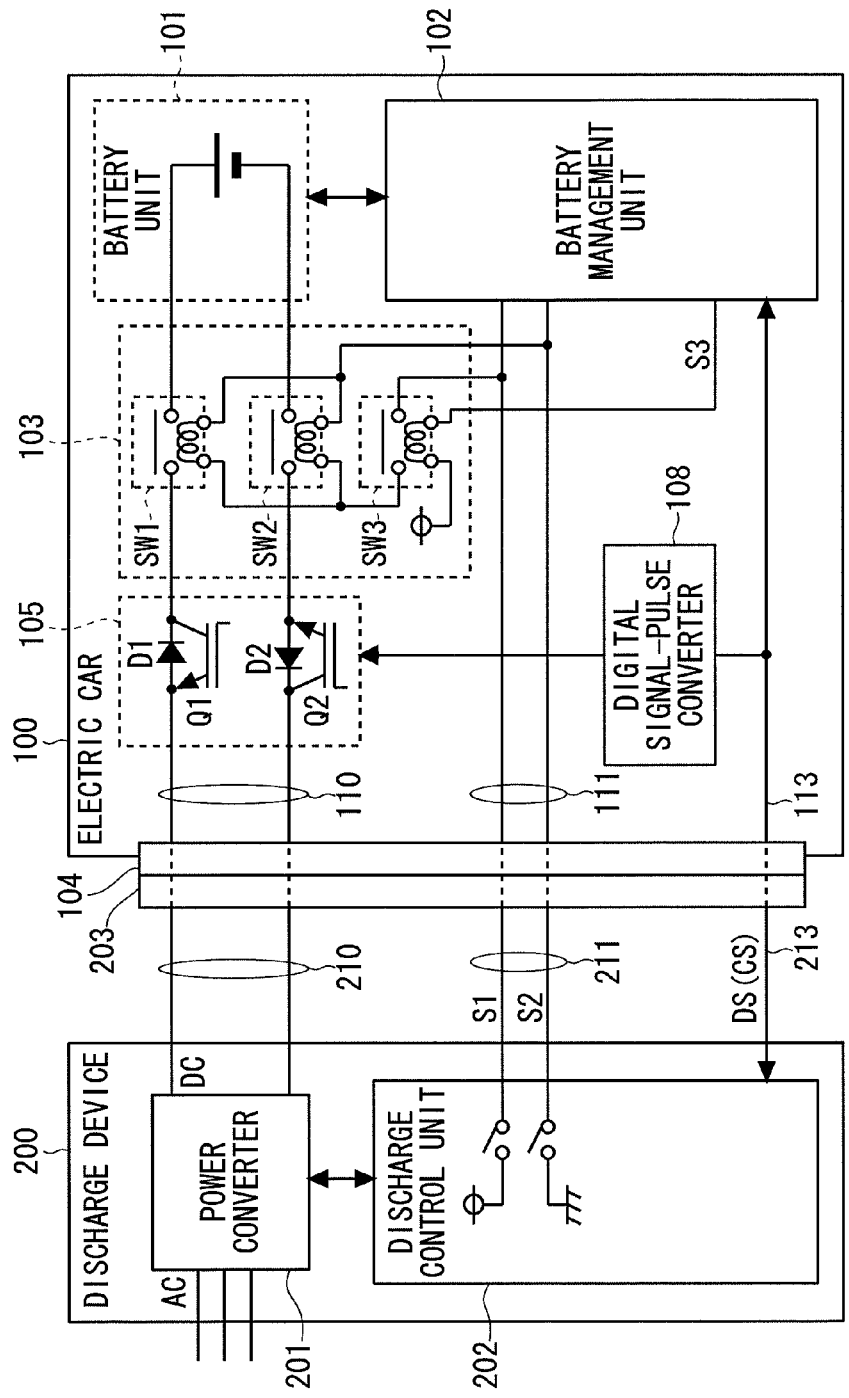
FIG. 4 A diagram showing a configuration of a discharge system according to an embodiment 3.

FIG. 4 is a diagram showing a configuration of a discharge system according to an embodiment 3. This system has the same configuration as that shown in FIG. 1, except that the power control signal CS outputted by the discharge control unit 202 in order to control the power adjustment part 105 is included in the digital signal DS.

In this case, the electric car 100 is provided with a digital signal-pulse converter 108 that extracts information of the power control signal CS from the digital signal DS and generates a pulse signal whose pulse width (duty cycle) is in accordance with the extracted information. The digital signal-pulse converter 108 may be build in the battery management unit 102.

In this embodiment, it is not necessary that the discharge device 200 includes the signal line 212 that is dedicated for the power control signal CS. Instead, the communication line 213 for the digital signal DS is used to transmit the power control signal CS. Accordingly, the structures of a harness, a housing, and a connector can be in common with those of the conventional charge device. This contributes to reduction in the manufacturing cost.

DESCRIPTION OF THE REFERENCE NUMERALS

100 electric car; 101 battery unit; 102 battery management unit; 103 interlock relay; 104 connector; 105 power adjustment part; 106 voltage-pulse converter; 107 low-pass filter; 108 digital signal-pulse converter; 200 discharge device; 201 power converter; 202 discharge control unit; 203 connector; 220 charge/discharge device; 221 power converter; 222 charge/discharge control unit; SW1 to SW3 switch; D1, D2 diode; Q1, Q2 switching element

The invention claimed is:

1. A discharge system comprising:
   a vehicle having a battery mounted thereon; and
   a discharge device configured to be connected to said vehicle from the outside and discharge said battery,
   wherein said vehicle includes:
     a battery management device that manages a state of said battery;
     a connector to which said discharge device is connected;
     a power line that connects said connector and said battery to each other;
     a switch that renders said power line conducting upon permission from both said discharge device and said battery management device; and
     a power adjustment circuit configured to adjust a current flowing in said power line when said discharge device discharges said battery through said connector.

2. The discharge system according to claim 1, comprising an unidirectional conducting element that is connected in parallel with said power adjustment circuit, and allows a current directed to charging said battery from said connector to flow.

3. The discharge system according to claim 1, wherein said power adjustment circuit adjusts a current flowing in said power line based on a control signal given from said discharge device.

4. The discharge system according to claim 3, wherein said power adjustment circuit comprises a switching element provided in series with said power line,
   said control signal is a pulse signal for performing pulse width control on said switching element.

5. The discharge system according to claim 3, wherein said power adjustment circuit comprises a switching element provided in series with said power line,
   said control signal is an analog voltage signal,
   said vehicle further includes a conversion circuit that converts said voltage signala signal into a pulse signal whose pulse width is in accordance with the amplitude of said voltage signal, said switching element is controlled by pulse width control based on said pulse signal.

6. The discharge system according to claim 3, further comprising
communication means for performing communication between said discharge device and said battery management device, wherein
said power adjustment circuit comprises a switching element provided in series with said power line,
said control signal is a digital signal that is transmitted from said discharge device through said communication means,
said vehicle further includes a conversion circuit that converts said digital signal into a pulse signal whose pulse width is in accordance with said digital signal,
said switching element is controlled by pulse width control based on said pulse signal.

7. The discharge system according to claim 3, wherein
when a defect occurs at a time of discharging said battery, said discharge device lowers a current flowing in said power line by means of said power adjustment circuit, and then opens a switch.

8. An electric vehicle comprising:
a battery;
a battery management device that manages a state of said battery;
a connector to which an external discharge device is connected, said connector enabling power of said battery to be outputted to said discharge device;
a power line that connects said connector and said battery to each other;
a switch that renders said power line conducting upon permission from both said discharge device and said battery management device; and
a power adjustment circuit configured to adjust a current flowing in said power line when said discharge device discharges said battery through said connector.

9. The electric vehicle according to claim 8, comprising
an unidirectional conducting element that is connected in parallel with said power adjustment circuit, and allows a current directed to charging said battery from said connector to flow.

10. The electric vehicle according to claim 8, wherein
said power adjustment circuit adjusts a current flowing in said power line based on a control signal given from said discharge device.

11. The electric vehicle according to claim 8, wherein
said power adjustment circuit comprises a switching element provided in series with said power line.

* * * * *